March 26, 1963     E. M. LACEY, JR     3,083,002

REFRIGERATED CHUCK AND METHOD FOR HOLDING WORKPIECE

Original Filed Oct. 28, 1955     2 Sheets-Sheet 1

INVENTOR.
E.M. LACEY JR.
BY S. Tierney Jr.
ATTORNEY

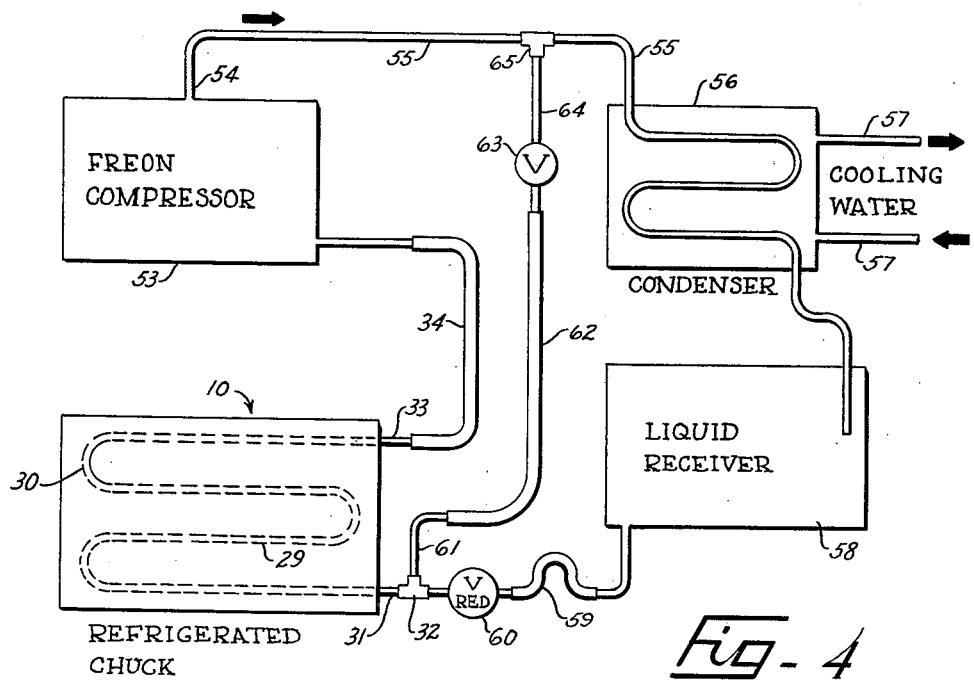
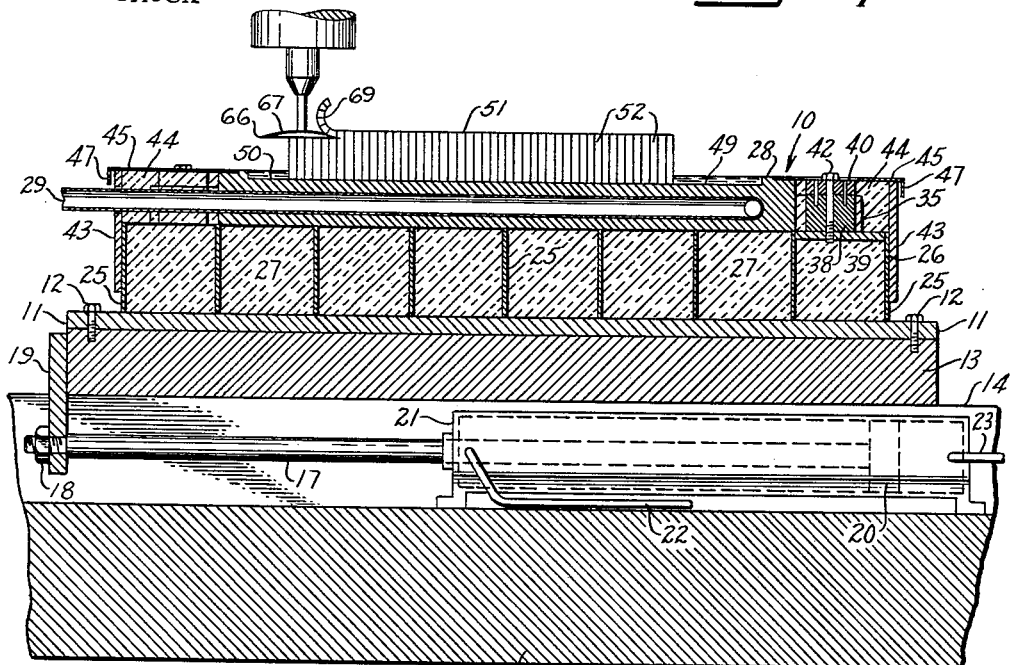

United States Patent Office 3,083,002
Patented Mar. 26, 1963

3,083,002
REFRIGERATED CHUCK AND METHOD FOR HOLDING WORKPIECE
Elbert M. Lacey, Jr., Chula Vista, Calif., assignor to Rohr Corporation, a corporation of California
Continuation of application Ser. No. 543,543, Oct. 28, 1955. This application Oct. 9, 1958, Ser. No. 767,078
4 Claims. (Cl. 269—7)

This application is a continuation of my application Serial Number 543,543, filed October 28, 1955, now abandoned.

Cellular metal core composed of a large number of interconnected cells has come into use, the metal strips from which the cells are formed being of aluminum alloy or stainless steel having a thickness of from .001 to .005 inch. The core is usually manufactured to a thickness somewhat greater than that desired so that it becomes necessary to remove some metal from one or both faces to reduce the core to the desired thickness. Due to the metal being so thin, it is extemely difficult to support and hold the core in holding chucks of the type usually used in metal cutting machines since the metal bends easily and the cells become distored out of shape. It is a principal object of my invention to provide a chuck which will hold and support the core without damaging it or altering the shape of its cells.

A further object is to provide a holding chuck which grips only the lower part of the core so that the entire top portion thereof is freely accessible to the cutting tool.

Another object is to provide a holding chuck having a cavity containing a pool of water or other liquid in which the lower part of the cellular core is submerged and means for freezing the water so that the resulting ice anchors the core to the chuck.

A further object is to provide means for conveniently and quickly melting the ice after the machining of the core is completed, so that the machined core can easily be removed from the chuck.

Another object is to provide means for insulating the chuck to minimize the transfer of heat to the water while it is being frozen and also to the ice while the core is being machined.

A further object is to provide means for supporting the chuck so that it is free to expand and contract as its temperature is lowered to form ice therein and as its temperature is later rapidly raised to melt the ice.

Further objects will become apparent as the description of my novel chuck proceeds. For a better understanding of the invention, reference is made to the accompanying drawing, in which:

FIG. 2 is a longitudinal section on line 2—2 of FIG. 1 also showing a table supporting the chuck and means for reciprocating same together with a tool for cutting a piece of honeycomb secured to the chuck;

FIG. 4 is a diagramatic view of a refrigeration system for freezing and heating the chuck.

Figure 1:
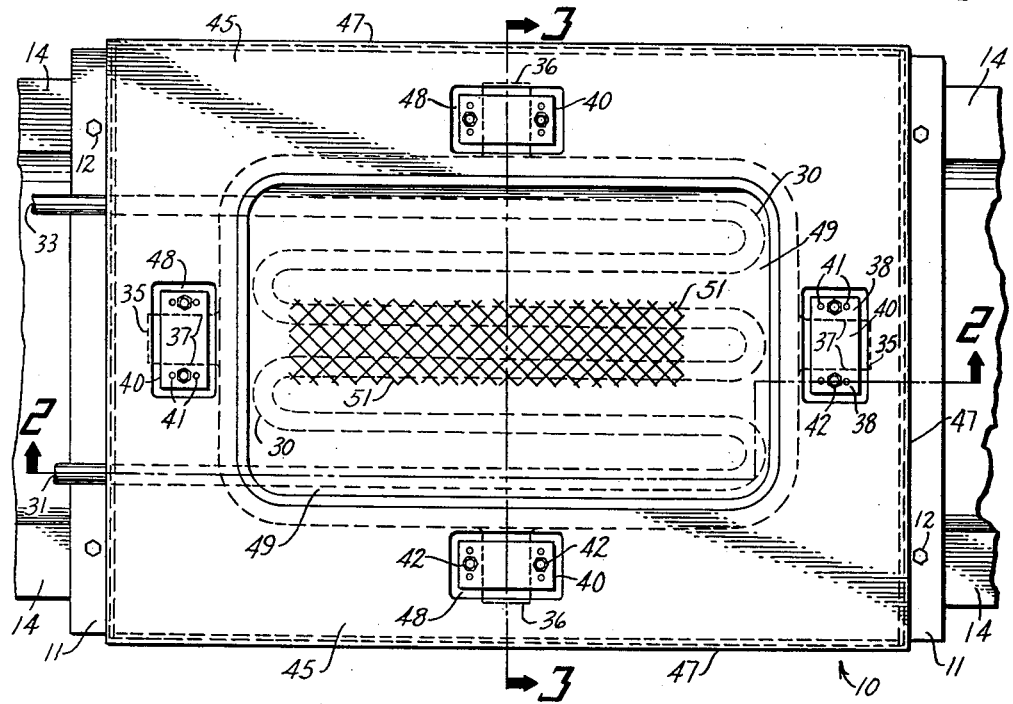
FIG. 1 is a top view of a holding chuck embodying the invention and a portion of a machine bed, certain internal parts being omitted for clarity.
Figure 3:
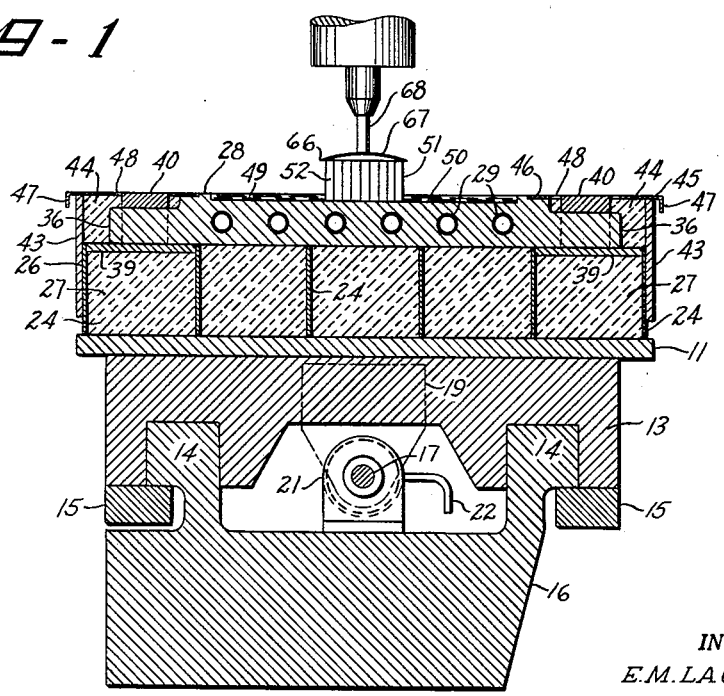
FIG. 3 is a transverse section of the chuck and machine bed taken on line 3—3 of FIG. 1.

The chuck 10 comprises a rectangular metal plate 11 which is bolted by bolts 12 to the movable bed 13 of a cutting machine having a pair of parallel ways 14 much longer than bed 13. The bed is prevented from raising off the ways by a pair of parallel bars 15 attached to bed 13 and having portions extending under ways 14. Ways 14 are integral with a long stationary machine base 16 adapted to rest on the shop floor.

Any suitable drive means may be used to reciprocate bed 13 on the ways 14, that shown comprising a piston rod 17 having one end secured by nut 18 to the lower end of a bracket 19 which is attached to and depends from one end of bed 13. Piston rod 17 is attached to a piston 20 slidable in a cylinder 21 attached to base 16, hydraulic fluid under pressure being admitted to one end of the cylinder by a pipe 22 and later to the opposite end by a pipe 23.

Welded to plate 11 of the chuck are a plurality of thin metal plates 24, 25, the plates 24 extending longitudinally and intersecting and transversely extending plates 25 to form a lattice 26 whose upper face is horizontal. The lattice compartments are filled with any good heat-insulating material 27 such as finely ground or crushed cork. Seated on lattice 26 is a cast metal generally rectangular block 28 preferably made of kirksite, an alloy which conducts heat well and consists substantially of 4 percent copper, 4 percent aluminum, balance zinc. Cast within block 28 is a long copper pipe or coil 29 having a plurality of parallel portions connected at their ends by return elbows 30. The inlet end 31 of pipe 29 (see FIG. 4) has a T 32 connected thereto and the outlet end 33 of the pipe is connected to a long flexible hose 34. Cast integral with casting 28 and extending parallel to the longitudinal axis thereof are a pair of rectangular projecting lugs 35 and projecting from the sides of casing 28 midway between the ends thereof are a pair of integral lugs 36 similar to lugs 35. The vertical side faces 37 of each lug slidably engage the vertical faces of a pair of similar guide blocks 38 which rest on and are secured to a short rectangular plate 39 welded to lattice 26. Extending over each lug 35, 36 is a short plate 40 provided near each end with a pair of depending locating dowels 41, which extend into holes bored in the top of block 38. Each plate 40 is secured so that it rests lightly on top of lug 35 or 36 by a pair of bolts 42 whose lower ends are screwed into threaded holes in plate 39 (see FIG. 2).

A rectangular metal frame 43 is attached to the sides and ends of lattice 26 by welding or other known means (not shown) and the space between this frame and casting 28 is filled with resilient heat insulating material 44 such as powdered cork or blocks of compressed cork. A thin metal cover 45 has its inner portion 46 attached by any suitable means (not shown) to the top of casting 28, the cover terminating in a peripheral depending flange 47 and the cover having four rectangular slots 48 somewhat larger than plates 40 and into which these plates project. The outer portion of cover 45 is not attached to frame 43 but is free to slide out and in on the frame as casting 28 expands and contracts under changes in temperature. Cover 45 thus protects the dry insulation 44 from being wetted by water or other liquid which might otherwise be spilled thereon with a resulting increase in its heat conductivity.

The upper portion of casting 28 is provided with a generally rectangular shaped cavity 49 of large area whose depth depends on the thickness of the workpiece to be anchored fast to the casting. The bottom face 50 of the cavity is machined flat preferably within a tolerance of .001 inch or less. If a strip of honeycomb core 51 up to 2 inches thick is to be machined, a cavity depth of one quarter inch has been found sufficient. The invention is illustrated in connection with the machining of a honeycomb core 51 whose individual cell walls 52 are vertical, but it will be understood that for machining workpieces of other types, the depth of cavity 49 will be increased to provide sufficient holding power to anchor the workpiece securely.

The chuck 10 is cooled or heated by the system shown diagrammatically in FIG. 4 wherein the outlet end of hose 34 is connected to the inlet of a compressor 53, the system being filled with a suitable refrigerant such as Freon. The outlet 54 of the compressor is connected by pipe 55 to a condenser 56 which cools the compressed gas and liquifies it, the condenser being cooled by cooling water supplied through a pipe 57. The liquified Freon under high pressure passes into a storage receiver 58 from which it passes through a long flexible hose 59 to a reducing valve 60 which reduces its pressure. The outlet of valve 60 is connected to T 32 and the lateral arm of the T is connected by a short pipe 61 to one end of a long flexible hose 62. The other end of hose 62 is connected to a valve 63 and pipe 64 to a T 65 in pipe line 55. T 32 and reducing valve 60 are preferably mounted closely adjacent the inlet end 31 of coil 29, as shown in FIG. 4, so that as the liquid Freon commences to evaporate after passing through pressure reducing valve 60, the bulk of the evaporation takes place in coil 29 with a marked reduction in its temperature.

To machine the core 51 made of stainless steel or other metal, piston 20 is moved to the right hand end (FIG. 2) of cylinder 21 and cavity 49 almost filled with water. The core is then placed in the cavity with the lower ends of the cells resting on flat face 50. With valve 63 closed, the compressor 53 is started, the compressor being driven by an electric motor (not shown) in the usual manner. After a short time, the evaporation of the Freon in coil 29 commences to cool it and this cooling is continued until reducing valve 60 and T 32 become covered with frost. Soon thereafter the water in cavity 49 turns to ice and since this ice extends up into all the cells of the core and also surrounds the lower portion of the edge of the core, the ice anchors the core to casting 28. While the ice is being formed, casting 28 contracts but its position on lattice 26 does not change, the four lugs 35, 36 and their cooperating guide blocks 38 preventing any displacement or shifting of the casting on the lattice. The insulation 27 and 44 prevent heat from the room from reaching the bottom or sides of casting 28 and thus hasten the freezing. To facilitate the cutting, the entire upper portion of core 51 including the insides of the cells is covered with a thick film of lubricant, preferably a soap jelly made by dissolving Ivory soap in water. This may be applied with a brush or other applicator. Pressure fluid is supplied by pipe 23 (FIG. 2) to move piston 20 and casting 28 to the left, thus advancing the upper end of core 51 against the sharp peripheral edge 66 of a thin metal cutter 67 attached to a spindle 68 rotating at a high speed. The top of the cutter is convex and serves to curl up the thin strip which is severed from the top of core 51 as indicated at 69, FIG. 2. When the cut is completed and piston 20 has reached the end of its stroke, it is stopped by discontinuing the supply of pressurized fluid to pipe 23.

The core 51 shown has a width somewhat less than the outside diameter of cutter 67 so that the cutting is effected by one stroke of the piston. If the core is wider, the spindle 68 is moved sidewise, by moving it and a carriage (not shown) which supports it sidewise, the carriage being mounted on a stationary transversely extending guideway disposed at a level above spindle 68 in the manner usual in vertical milling machines. Pressure fluid is then supplied to pipe 22 to move piston 20 and core 51 toward the right in FIG. 2, the cutter 67 severing more core on its return stroke. This process is continued until the entire upper end of the anchored core is at the same level. During the machining, the ends of flexible hoses 34, 59 and 62 which are attached to end 33 of coil 29, valve 60 and pipe 61 respectively move with casting 28 while the other ends of the hoses are stationary so no interruption of the Freon circulation occurs nor any leakage.

To remove the machined core from chuck 10, the operator opens valve 63 which permits the hot compressed Freon gas leaving compressor 53 to pass through hose 62, pipe 61 and T 32 into the inlet end 31 of coil 29. The heat of the hot gas passing through coil 29 is conducted via the metal of casting 28 to the ice in cavity 49 which it soon melts. Since casting 28 is not securely attached to lattice 26, it is free to expand and contract without setting up any internal stresses therein which would cause it to warp or otherwise become distorted. The result is that face 50 of the casting remains plane and does not change the configuration of the core 51 which rests thereon. As soon as the ice is melted, core 51 may be removed from the chuck and washed with water to remove any of the soap jelly adhering thereto. To machine a second core, the operator closes valve 63, places the core in the water in cavity 49 and repeats the operations above described.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A chuck for supporting and securing the lower end portion of a workpiece for machining of the upper end portion thereof comprising: a rigid workpiece supporting member having a recessed surface for receiving and supporting the workpiece in contact therewith and for receiving a pool of liquid for immersion of said lower end portion of the workpiece therein, said workpiece supporting member having internal means in heat transfer relationship with respect to said workpiece supporting surface for withdrawing heat from said liquid sufficient to solidify the same and secure the workpiece to its supporting member, or selectively, for transferring heat to the solidified liquid sufficient to melt the same and release the workpiece from its supporting member; a rigid base member having said workpiece supporting member slidably seated thereon; first and second members secured to said workpiece supporting member on opposite sides thereof and aligned for movement along a first center line of the workpiece supporting member; third and fourth members secured to said workpiece supporting member on opposite sides thereof and aligned for movement along a second center line of the workpiece supporting member perpendicular to said first center line thereof; first, second, third and fourth complementary members secured to said base member for slidably receiving said first, second, third and fourth members respectively of the workpiece supporting member for said movement of the members each along its center line while preventing movement laterally thereof as the workpiece supporting member contracts and expands in response to said withdrawing and transferring of heat from and to said liquid.

2. A chuck as in claim 1, said first, second, third and fourth members secured to said workpiece supporting member comprising lug projections extending outwardly from the sides thereof along said center lines, and said first, second, third and fourth complementary members comprising sockets for respectively receiving said lug projections slidably therewithin.

3. A chuck as in claim 1, said workpiece supporting member being formed of heat conducting material and said internal means comprising a long continuous channel through the interior of the workpiece supporting member for passage of cooling and heating fluids therethrough.

4. A chuck as in claim 1, said workpiece support surface being planar, said workpiece being a thin walled honeycomb core having a planar face in contact with said support surface, and said liquid being water.

(References on following page)

References Cited in the file of this patent

UNITED STATES PATENTS

| | | |
|---|---|---|
| 412,802 | Simoulin | Oct. 15, 1889 |
| 995,537 | Cookingham | June 20, 1911 |
| 1,556,722 | Scott | Oct. 13, 1925 |
| 1,623,167 | Christiansen | Apr. 5, 1927 |
| 2,083,093 | Rorrek | June 8, 1937 |
| 2,084,883 | Atchison | June 22, 1937 |
| 2,487,289 | Yoemans | Nov. 8, 1949 |
| 2,543,196 | Philipp | Feb. 27, 1951 |
| 2,586,532 | Granfield | Feb. 19, 1952 |
| 2,629,230 | Turner | Feb. 24, 1953 |
| 2,641,879 | Dalrymple | June 16, 1953 |
| 2,855,664 | Griffith et al. | Oct. 14, 1958 |
| 2,905,064 | Nielsen | Sept. 22, 1959 |

OTHER REFERENCES

Publication Steel, July 30, 1956, page 91, ice is nice.